(12) United States Patent
Stone et al.

(10) Patent No.: US 7,201,066 B1
(45) Date of Patent: Apr. 10, 2007

(54) SYSTEM FOR AUTOMATIC TIRE INFLATION

(75) Inventors: Marvin Lyle Stone, Stillwater, OK (US); John Bruce Solie, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 4 days.

(21) Appl. No.: 11/093,769

(22) Filed: Mar. 30, 2005

(51) Int. Cl.
*G01F 1/37* (2006.01)
*B60C 23/02* (2006.01)

(52) U.S. Cl. .................. 73/861.52; 73/146.2
(58) Field of Classification Search ............. 73/861.42, 73/861.52, 146, 146.3
See application file for complete search history.

(56) References Cited

U.S. PATENT DOCUMENTS

| | | | |
|---|---|---|---|
| 3,250,469 A * | 5/1966 | Colston ................... 73/861.52 |
| 3,792,609 A * | 2/1974 | Blair et al. .............. 73/861.52 |
| 4,040,293 A | 8/1977 | Wilson |
| 4,088,009 A | 5/1978 | Fukuda |
| 4,167,114 A | 9/1979 | Zizine |
| 4,337,639 A | 7/1982 | Jackson |
| 4,377,090 A * | 3/1983 | Seulen ................... 73/861.74 |
| 4,431,043 A | 2/1984 | Goodell et al. |
| 4,441,539 A | 4/1984 | Hulse |
| 4,471,655 A | 9/1984 | Obayashi et al. |
| 4,574,267 A | 3/1986 | Jones |
| 4,619,303 A | 10/1986 | Bryan et al. |
| 4,640,331 A | 2/1987 | Braun et al. |
| 4,825,925 A | 5/1989 | Schultz |
| 4,860,579 A | 8/1989 | Beverly |
| 5,010,224 A | 4/1991 | Shirey et al. |
| 5,357,972 A | 10/1994 | Norlien |
| 5,377,736 A | 1/1995 | Stech |
| 5,461,932 A | 10/1995 | Hall et al. |
| 5,538,062 A | 7/1996 | Stech |
| 5,722,417 A | 3/1998 | Garbe |
| 5,767,398 A * | 6/1998 | Naedler ................. 73/146.2 |
| 6,105,645 A | 8/2000 | Ingram |
| 6,128,963 A * | 10/2000 | Bromster ............... 73/861.52 |
| 6,164,142 A | 12/2000 | Dimeff |
| 6,182,727 B1 | 2/2001 | Beesley |
| 6,269,691 B1 * | 8/2001 | Sowatzke et al. ........ 73/146.2 |
| 6,294,989 B1 | 9/2001 | Schofield et al. |
| 6,357,484 B1 * | 3/2002 | Semerdjian ............. 138/44 |
| 6,363,985 B1 | 4/2002 | Beesley |
| 6,539,968 B1 * | 4/2003 | White et al. ............ 137/10 |
| 6,561,017 B1 | 5/2003 | Claussen et al. |
| 6,585,019 B1 | 7/2003 | Ingram |
| 6,594,566 B1 | 7/2003 | Skoff |
| 6,598,462 B2 | 7/2003 | Williams |
| 6,601,460 B1 | 8/2003 | Materna |
| 6,640,588 B2 | 11/2003 | Semerdjian |
| 6,774,774 B2 | 8/2004 | Schofield et al. |
| 6,778,075 B2 | 8/2004 | Headley et al. |
| 6,800,108 B2 * | 10/2004 | Noda .................... 55/523 |
| 6,843,139 B2 * | 1/2005 | Schumacher et al. .... 73/861.52 |
| 2004/0007302 A1 | 1/2004 | Hamilton et al. |

* cited by examiner

*Primary Examiner*—Harshad Patel
(74) *Attorney, Agent, or Firm*—Fellers, Snider, Blankenship, Bailey & Tippens

(57) ABSTRACT

An apparatus and method for measuring gas flow rates and an improved automatic vehicle tire inflation system which utilizes the inventive gas flow measurement apparatus and method. The gas flow measuring apparatus and method utilize a porous media material effective for creating an appropriate pressure differential relative to the gas flow rate.

14 Claims, 3 Drawing Sheets

SYSTEM FOR AUTOMATIC TIRE INFLATION

FIELD OF THE INVENTION

The present invention relates to apparatuses and methods for measuring gas flow rates. More particularly, but not by way of limitation, the present invention relates to apparatuses and methods which are effective for measuring gas flow rates under low flow conditions. The present invention also relates to an improved system for automatic tire inflation which uses the inventive gas flowmeter to determine the rate of make-up air flow.

BACKGROUND OF THE INVENTION

On-board automatic tire inflation systems are currently available for use on trucks and other vehicles. Such systems automatically deliver make-up air to a vehicle tire in the event that the tire is punctured or begins to leak for other reasons. For a given trailer, truck, or other vehicle axle assembly, automatic inflation systems can be installed as appropriate for monitoring and maintaining a desired air pressure in each tire individually, in dual tire sets, or in the entire axle assembly as a whole.

By way of example, an on-board system currently available from Airgo, Inc. of Edmond, Okla. for maintaining a predetermined pressure in each of the tires of a truck tandem axle assembly comprises: a tire inflation system which delivers compressed air from an on-board compressor (e.g., the compressor used for supplying air to the truck brakes) to the interior of the tandem axle, or to a tube extending through the axle, in the event that a leak occurs in any of the four tandem axle tires; a pair of rotary seals provided proximate the outer ends of the tandem axle; a set of air lines extending from the rotary seals for delivering air from the interior of the axle, through the rotary seals, to each of the four tires; check valves provided in the air lines for preventing reverse air flow from the tires to the axle; and an indicator light which alerts the operator that a leak has developed. The system controls the make-up air flow in accordance with the operating pressure required by the tires. For most tandem truck axles, the automatic inflation system will preferably be operable for providing a sufficient rate of make-up air flow to maintain a tire pressure of at least 90 psig and more preferably at least 95 psig.

An on-board automatic inflation system of this type is described, for example, in U.S. Pat. No. 6,105,645, the entire disclosure of which is incorporated herein by reference.

A need currently exists for an economical gas flowmeter which can be used in on-board automatic tire inflation systems for determining leakage severity by accurately measuring the rate of make-up air flow delivered by the inflation system. In the event of a nail puncture wherein the nail remains in the tire, the resulting air leakage rate from the tire can be as low as 0.1 milliliter per minute ("ml/min") and will typically be in the range of from about 0.1 to about 40 ml/min. Air leakage rates of up to 100 ml/min or higher can result if the nail is removed or if other types of punctures occur.

As will be understood by those in the art, conventional thermal loss devices, capillary pressure loss devices, and positive displacement devices capable of accurately measuring flow rates of as low as 0.1 ml per minute typically are expensive and are not suited to handle the moisture and contaminant levels present in on-board compressed air systems. Some devices also are not suited to handle the vibration levels encountered during vehicle operation. In addition, the on-board air compression systems in many vehicles are not sufficient to accommodate the amount of pressure loss produced by the operation of some conventional flowmeters such as positive displacement devices.

Flowmeters which either employ a flow element having a single orifice or employ a flow element having a collection of multiple large orifices or pores such as disclosed in U.S. Pat. No. 4,040,293, U.S. Pat. No. 5,461,932, U.S. Pat. No. 5,722,417, or U.S. Pat. No. 6,164,142 also are not well suited for use in automatic tire inflation systems. These devices are susceptible to plugging and, even when the flow element has a collection of orifices extending therethrough, the device can cease to operate effectively if a few or sometimes even if just one of the orifices is/are blocked.

U.S. Pat. No. 5,357,972 discloses a disposable pneumotachograph flowmeter for measuring human respiratory flow. The pneumotachograph flowmeter comprises a pair of conical mouth pieces having a fabric screen made of a hydrophobic fabric material sandwiched therebetween. It is stated that the hydrophobic fabric material prevents the fabric screen from being occluded with moisture. The fabric screen is said to have about 400 pores per square inch with an average pore size of $2.25 \times 10^{-6}$ square inches so that laminar flow through the screen is enhanced to provide a more linear relationship between flow and pressure drop.

The only use disclosed or suggested in U.S. Pat. No. 5,357,972 for the disposable pneumotachograph flowmeter is for measuring respiratory flow. Moreover, neither the disclosed disposable pneumotachograph flowmeter nor the fabric screen employed therein is suitable for use in an on-board automatic tire inflation system. Although the fabric screen of the pneumotachograph flowmeter is hydrophobic, the fabric will likely absorb other contaminants such as oil droplets which are typically present in truck air systems. In addition, a fabric screen is not well suited to handle the vibration levels encountered in on-board tire inflation systems and, because a fabric screen has little or no inherent stiffness, significant additional measures would be required to contain and hold the fabric screen in operating position and to maintain its shape.

SUMMARY OF THE INVENTION

The present invention provides an inventive gas flowmeter and method, as well as an improved on-board automatic tire inflation system including the inventive flowmeter, which satisfy the needs and alleviate the problems discussed above. The inventive gas flowmeter is compact, economical, highly durable, and vibration resistant and is well suited for accurately measuring air flow rates of as low as 0.1 ml/min to up to 100 ml/min or more. In addition, the inventive gas flowmeter is particularly effective for operation at the moisture, oil, and particulate levels encountered in vehicle air supply systems. The flow element employed in the inventive gas flowmeter can readily be selected and produced to prevent or minimize oil and water absorption and will maintain its shape during operation. Further, the inventive gas flowmeter provides a linear relationship between flow and pressure drop and will continue to operate effectively even if it becomes partially plugged.

In one aspect, there is provided an apparatus for measuring a rate of gas flow comprising a housing having a passageway for the gas flow and a porous media element positioned in the passageway for creating a pressure differential across the porous media element relative to the rate of the gas flow. The porous media element comprises a porous media material which has been formed by bonding a particulate material by heating or by using a bonding agent to produce a porous coherent mass.

In another aspect, there is provided a method of measuring a rate of a gas flow comprising the step of delivering the gas flow through a porous media in a manner effective for creating a pressure differential relative to the rate of the gas flow. The porous media is formed from a particulate material which has been bonded by heating or by using a bonding agent to produce a porous coherent mass.

In another aspect, there is provided an improved apparatus for automatically delivering a make-up air flow from a vehicle air supply source when a leakage of tire air occurs. The improvement comprises a flowmeter for determining leakage severity by measuring the rate of make-up air flow. The flowmeter includes a porous media effective for creating a pressure differential relative to the rate of make-up air flow.

Further aspects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

Figure 1:
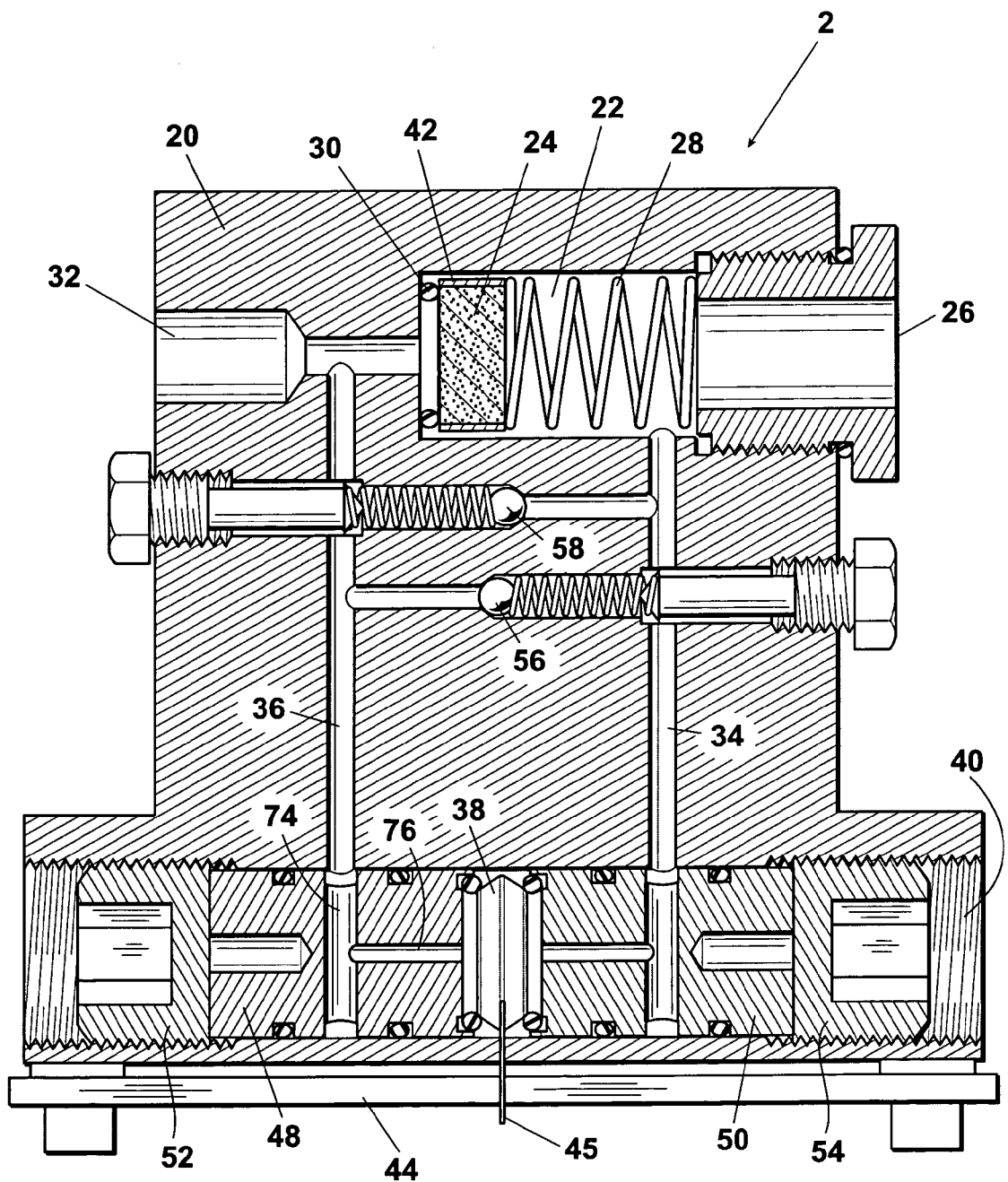
FIG. 1 is a schematic elevational cross-sectional view of an embodiment 2 of the gas flowmeter provided by the present invention.
Figure 2:
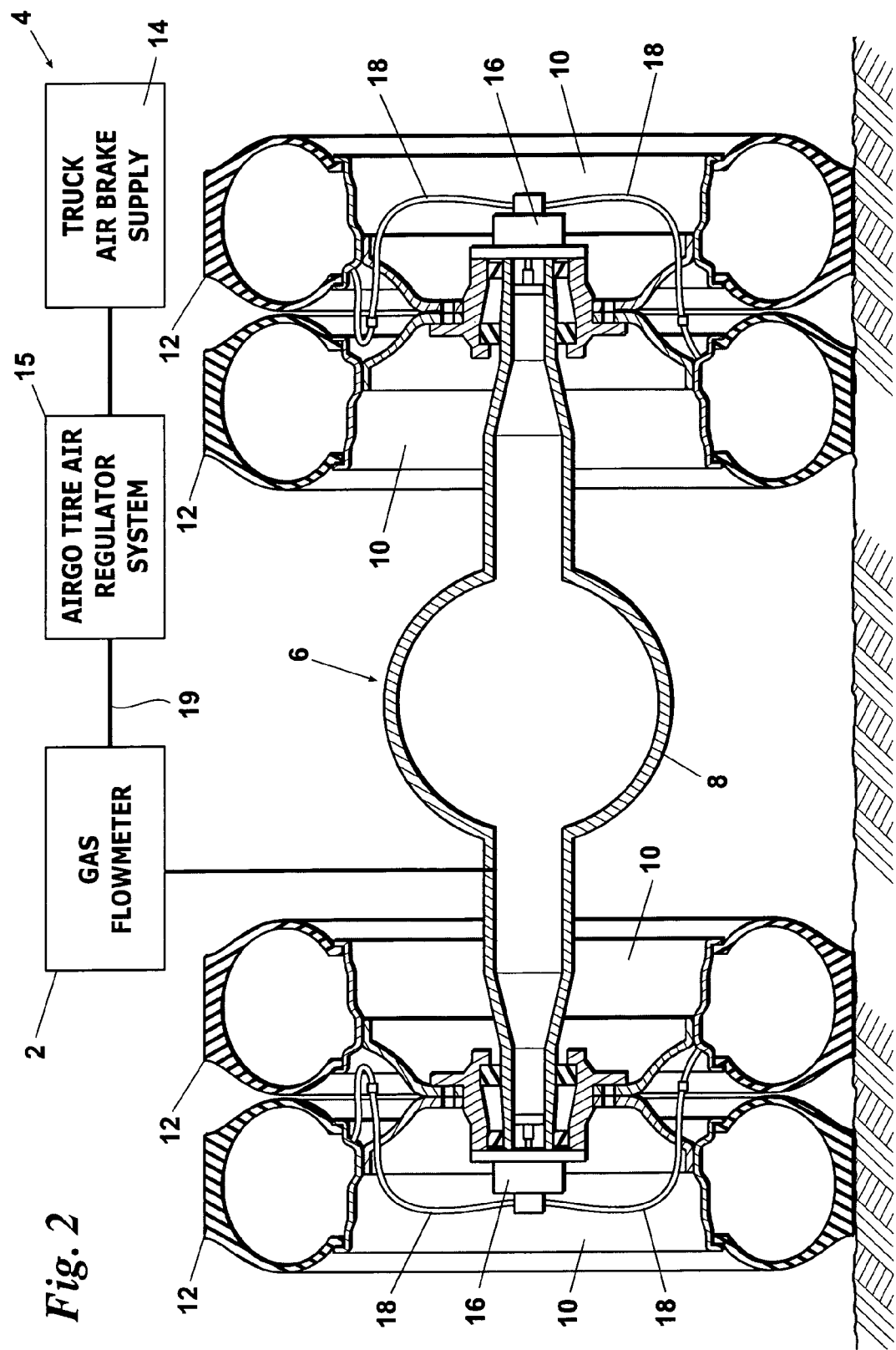
FIG. 2 is a schematic illustration of an embodiment 4 of an improved automatic tire inflation system provided by the present invention.

An embodiment 2 of the inventive gas flowmeter is illustrated in FIG. 1. An embodiment 4 of an inventive improved automatic tire inflation system 4 which incorporates the inventive gas flowmeter 2 is illustrated in FIG. 2. The particular embodiment 4 of the improved automatic inflation system illustrated in FIG. 2 is for maintaining tire air pressure in a truck trailer tandem axle assembly 6. The tandem axle assembly 6 comprises a tandem axle 8 having a pair of tandem wheels 10 and tires 12 mounted on each end of the axle 8. It will be understood, however, that the inventive improved tire inflation system can be readily adapted for maintaining inflation in individual tires, in dual tire sets, or any other type of tire and/or axle system or assembly.

The inventive improved automatic tire inflation system 4 is of a type known in the art which will automatically and continuously deliver compressed air from an on-board air supply system 14 (e.g., the vehicle compressor which supplies air to the brake system) to the axle 8 in the event that the system detects a drop in air pressure as a result of any leakage from one or more of the tires 12. The axle 8 can have a flexible tube extending therethrough for receiving the air flow or, alternatively, the interior of the axle 8 can be sealed for receiving the air flow directly. In either case, the automatic inflation system 4 preferably further comprises rotary seals 16 provided outside of the outer ends of the axle 8 (preferably on hub caps spaced apart from the outer ends of the axle 8) and a set of flexible hoses or other air lines 18 which extend from the rotary seals 16 to the wheels 10 for delivering make-up air from the interior of axle 8 to each of the tires 12, as needed. An air regulator 15 regulates the air delivered to the axle 8 from the on-board air supply system 14 so that a desired operating pressure is maintained in each of the tires 12.

In accordance with the inventive improvement to the automatic inflation system 4, the inventive gas flowmeter 2 is preferably installed in the make-up air line 19 downstream of the air regulator 15. Thus, the inventive gas flowmeter 2 can be used to determine the severity of leakage occurring from the tire(s) 12 by accurately measuring the rate of make-up air flow delivered by the regulator 15. As will be understood by those in the art, the continuous flow reading taken by the inventive gas flowmeter 2 can be directed, for example, to an alarm, a monitor, or any other system for: advising the vehicle operator that a leak has occurred; informing the operator of the rate of leakage; alerting the operator that an excessive amount of leakage is occurring; etc.

The embodiment 2 of the inventive gas flowmeter illustrated in FIG. 1 comprises: a meter block or other housing 20 having a gas flow passageway 22 extending therethrough; a porous media flow element 24 positioned in the gas flow passageway 22; an inlet connection 26 provided in the inlet end of the gas flow passageway 22; a coil spring 28 positioned in the gas flow passageway between the inlet connection 26 and the porous media element 24 for holding the porous media element 24 in operating position; an O-ring or other sealing element 30 which seals the outlet end of the porous media element 24 around the outlet connection 32 of the gas flow passageway 22; a high pressure transmission passage 34 extending from the gas flow passageway 22 at a point upstream of the porous media element 24; a low pressure transmission passage 36 extending from the gas flow passageway 22 at a point downstream of the porous media element 24; and a pressure element 38 positioned in a retaining bore or other cavity 40 provided in the bottom of the housing 20.

The porous media flow element 24 can be formed of generally any porous media material which is effective for accurately measuring gas flow over the range of rates experienced in the on-board tire inflation system, or other service in question, without exceeding the system differential pressure available for the operation of flowmeter 2. In a typical truck tire inflation system, the expected make-up air flow range can extend from a minimum flow rate of as low as 0.1 ml/min to a maximum make-up air flow rate of as high as 100 ml/min or more.

The porous media element 24 will preferably be effective for accurately measuring flows within the necessary range of flow rates without the pressure loss across the porous media element 24 exceeding 5 psi. More preferably, the pressure drop across the porous media will not exceed 3 psi and most preferably will not exceed 2 psi. The porous media employed in the porous media flow element 24 will also preferably be nonabsorbent and will preferably be effective for handling the moisture, oil, and other contaminant levels and vibration conditions experienced in on-board tire inflation systems.

Further, the porous media will preferably be effective such that the relation between the gas flow rate and the pressure drop across the porous media is substantially linear. In accordance with Darcy's Law, the relationship between the gas flow rate and the pressure drop across the porous media will typically be such that:

$$Q = KA \frac{dH}{dx}$$

wherein Q is the gas flow rate through the porous media, K is the hydraulic conductivity of the porous media, A is the cross-sectional flow area of the flow element 24, and dH/dx is the hydraulic gradient through the porous media reflecting the amount of pressure drop per length of flow.

In any application of the inventive gas flowmeter 2, the particular porous media selected for the flow element 24 will be a material having an appropriate hydraulic conductivity (K) for handling the expected range of flow rates without exceeding the pressure drop available for operation of the flowmeter 2. The hydraulic conductivity of the porous media will be determined at least in significant part by the average pore size and the pore density (i.e., the average number of pores per unit of cross-sectional flow area) of the material. The cross-sectional flow area and the length of the porous media flow element 24 can also be varied to assist in accommodating the expected flow range and available pressure drop.

For applications wherein the inventive gas flowmeter 2 is used for measuring make-up air flow rates in vehicle tire inflation systems, the porous media typically will preferably have a hydraulic conductivity in the range of from about $3 \times 10^{-7}$ to about $3 \times 10^{-4}$ meters per second (m/s) and will most preferably have a hydraulic conductivity in the range of from about $3 \times 10^{-6}$ to about $3 \times 10^{-5}$ m/s. In addition, the porous media will preferably have an average pore size in the range of from about 1 to about 40 micrometers and will more preferably have an average pore size in the range of from about 5 to about 15 micrometers.

Further, the cross-sectional flow area A and the hydraulic conductivity K of the porous media flow element 24 will preferably be selected as appropriate such that the length of the flow element 24 does not exceed one inch and more preferably is in the range of from about ⅛ to ¾ inch. In addition, the porous media element 24 and the porous media material will also most preferably each have a substantially nonflexible, fixed shape. Also, the porous media material will preferably be inert and corrosion resistant and will preferably have a uniform distribution of pores such that the media is effective for distributing flow evenly over the entire cross-sectional flow area thereof. By distributing the gas flow uniformly over the entire cross-sectional flow area, the inventive gas flowmeter 2 will continue to function effectively even in the event that a significant portion of the cross-sectional flow area becomes plugged.

The porous media material will preferably also be surrounded by an outer layer of impervious material 42. The impervious layer 42 can generally be any material which is suitable for the gas flow environment encountered and is effective for preventing the gas from flowing through the side of the porous media flow element 24. The impervious layer 42 thus prevents the gas flow from bypassing any portion of the porous media flow element 24 and ensures that all of the gas flow travels through the entire length and is distributed over the cross-sectional flow area of the flow element 24 so that an accurate flow measurement is obtained. Examples of preferred impervious materials include, but are not limited to, Teflon® (e.g., Teflon® tape) and plastics (e.g., Delrin or PVC).

The porous media material will preferably be formed from a particulate material which has been bonded by heating or by using a bonding agent (e.g., an inert glue material such as an epoxy resin or polyester) to produce a porous coherent mass. Examples of particulate materials suitable for use in forming the porous media material include but are not limited to ceramics, metals, glass, sand, compressed Teflon®, or combinations thereof, as well as particulate fluoropolymer materials and other particulate plastics.

Examples of porous media materials preferred for use in the porous media element 24 include sintered or foamed ceramic, sintered metal, fritted glass, fiberglass, or a combination thereof. The porous media materials most preferred for use in measuring make-up air flow rates in the inventive improved on-board tire inflation management system 4 are foamed or sintered ceramic and sintered metals such as sintered bronze, sintered stainless steel, and sintered brass. Suitable porous metal and ceramic materials of this type are available commercially, for example, from Soilwater, Inc. and Arrow Pneumatics.

The pressure element 38 employed in the inventive gas flowmeter 2 can be any type of device which is capable of handling the particular operating conditions in question and is effective for determining the pressure differential across the porous media flow element 24. Examples include but are not limited to solid state transducers and strain gauge pressure transducers. Solid state pressure transducers are compact and provide good performance and accurate measurement at reasonable cost and are therefore preferred for use in the inventive gas flowmeter.

In addition to the features discussed above, the embodiment 2 of the inventive gas flowmeter further comprises: a circuit board 44, preferably of a type commonly used with solid state pressure transducers, secured to the housing 20 for converting the pressure differential signal from the pressure element 38 to an appropriate electronic signal; electrical leads 45 extending from the pressure element 38 to the circuit board 44; spool elements 48 and 50 positioned on each side of the pressure element 38 for holding and sealing the pressure element 38 within the retaining bore 40; a pair of set screws 52 and 54 which retain the spools 48 and 50 in the bore 40 against the opposite sides of the pressure element 38; a pressure relief valve 56 for relieving an overpressure condition in the gas flow passageway 22 on the upstream side of the porous media flow element 24; and a pressure relief valve 58 for relieving an overpressure condition in the gas flow passageway 22 on the downstream side of the flow element 24.

The pressure relief valves 56 and 58 prevent damage to the pressure element 38 and are preferably adjustable ball check valve devices which are removably installed in the flowmeter housing 20 such that they are in fluid communication with the high and low pressure transmission passages 34 and 36. In the event that an excessive forward pressure differential exists across the flow element 24, the pressure relief valve 56 will open to allow gas flow to bypass the flow element 24 via the high and low pressure transmission passages 34 and 36. Similarly, if an excessive reverse pressure differential condition exists across the porous media flow element 24, the pressure relief valve 58 will open to allow reverse flow around the flow element 24 via the high and low pressure transmission passages 34 and 36.

Figure 3:
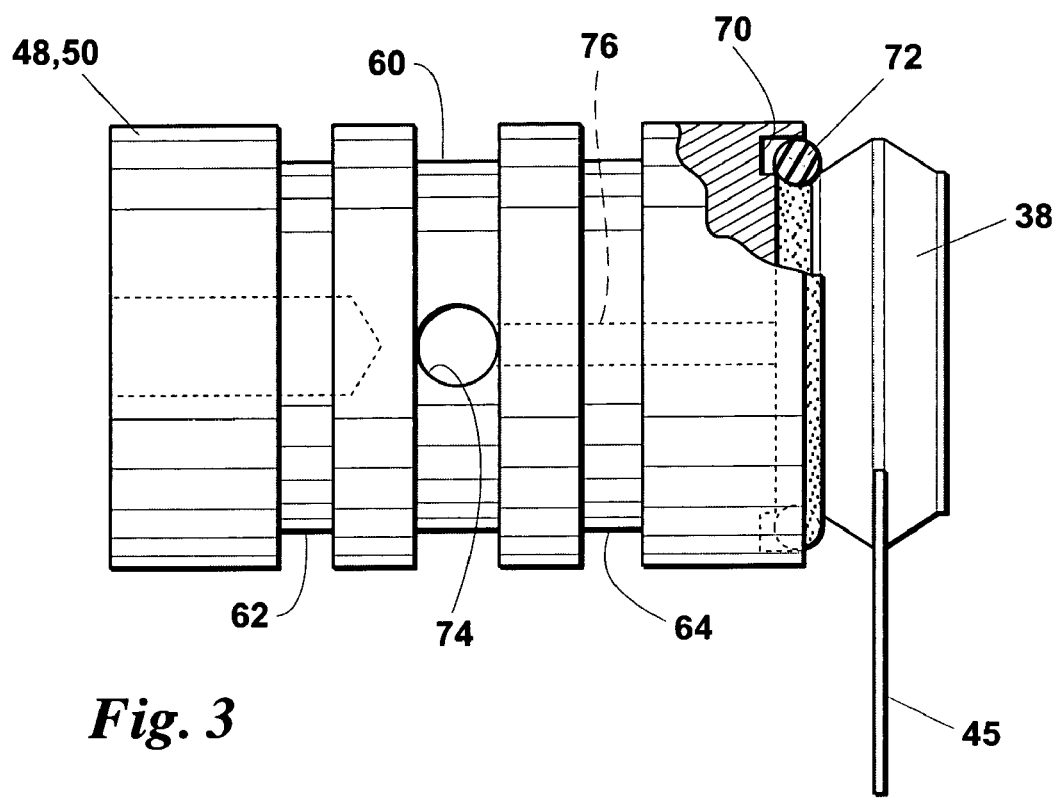
FIG. 3 is an elevational side view of a spool element 48 or 50 employed in the inventive gas flowmeter 2.

The spool elements 48 and 50 used in the inventive gas flowmeter 2 operate to seal and retain the pressure element 38 at an appropriate operating position within the retaining bore 40 and to place the high and low pressure transmission passages 34 and 36 of the flowmeter housing 20 in sealed communication with the opposite sides of the pressure element 38. As illustrated in FIGS. 1 and 3, each of the spool elements 48 and 50 preferably includes: a central outer groove 60 which is formed and positioned around the spool for alignment with either the high pressure transmission passage 34 or the low pressure transmission passage 36; an additional pair of outer grooves 62 and 64 on opposite sides of the central groove 60 wherein O-rings or other sealing elements are received for sealing and isolating the central groove 60 in fluid communication with the pressure transmission passage 34 or 36; a groove 70 provided in the forward end of the spool for receiving a gasket, O-ring, or other sealing element 72 which seals against the side face of the pressure element 38; a lateral bore 74 which extends through the spool element 48 or 50 and is positioned in the central groove 60; and a central bore 76 which extends longitudinally through the forward end of the spool element 48 or 50 to the lateral bore 74. Thus, the central outer groove 60, the lateral bore 74, and the longitudinal bore 76 operate together to place the side face of the pressure element 38 in fluid communication with the pressure transmission passage 34 or 36.

Figure 4:
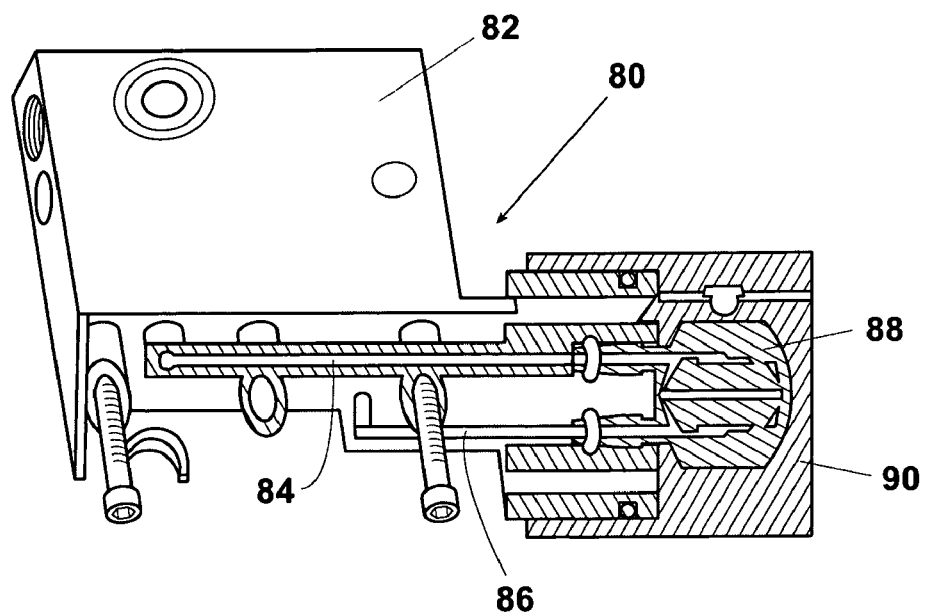
FIG. 4 is a perspective view of an alternative embodiment 80 of the inventive gas flowmeter.

An alternative embodiment 80 of the inventive gas flowmeter is illustrated in FIG. 4. The inventive gas flowmeter 80 operates in the same manner and is essentially identical to the inventive gas flowmeter 2 except that the housing block 82 of the inventive flowmeter 80 does not include a retaining bore wherein a pressure element is retained using spools and set screws. Rather, the inventive gas flowmeter 80 utilizes a high pressure manifold 84 and a low pressure manifold 86 which extend directly from the high and low pressure transmission passages of the housing block 82 to the pressure element 88. In addition, the pressure element 88 is positioned on the circuit board element 90.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In an apparatus for automatically delivering a make-up air flow from a vehicle air supply source to maintain a desired air pressure in at least one tire when a leakage of tire air occurs, the improvement comprising a flowmeter for determining leakage severity by measuring a rate of said make-up air flow, said flowmeter including:
   a porous media effective for creating a pressure differential across said porous media relative to said rate of said makeup air flow, said pressure differential across said porous media being not more than 5.6% of said desired air pressure in said tire; and
   a pressure transducer which directly measures said pressure differential across said porous media.

2. The apparatus of claim 1 wherein the improvement further comprises said porous media being a porous coherent mass comprised of a bonded particulate material.

3. The apparatus of claim 2 wherein the improvement further comprises said particulate material being ceramic, metal, glass, sand, Teflon®, or a combination thereof.

4. The apparatus of claim 1 wherein the improvement further comprises said porous media being sintered or foamed ceramic, sintered metal, fritted glass, fiberglass, or a combination thereof.

5. The apparatus of claim 4 wherein the improvement further comprises said porous media being sintered metal.

6. The apparatus of claim 1 wherein the improvement further comprises said porous media being sintered bronze, sintered stainless steel, or sintered brass.

7. The apparatus of claim 1 wherein the improvement further comprises said porous media being effective for measuring air flow at rates of from 0.1 milliliter per minute up to at least 100 milliliters per minute with said desired air pressure in said tire being at least 90 psig and without said pressure differential across said porous media exceeding 5 psi.

8. The apparatus of claim 7 wherein the improvement further comprises said porous media being effective such that said pressure differential across said porous media does not exceed 3 psi.

9. The apparatus of claim 7 wherein the improvement further comprises said porous media being effective such that said pressure differential across said porous media does not exceed 2 psi.

10. The apparatus of claim 1 wherein the improvement further comprises said flowmeter including:
   a first pressure relief valve for relieving pressure upstream of said porous media on an upstream side of said pressure transducer and
   a second pressure relief valve for relieving pressure downstream of said porous media on a downstream side of said pressure transducer.

11. The apparatus of claim 10 wherein the improvement further comprises each of said first and said second pressure relief valves being a ball-check valve.

12. The apparatus of claim 1 wherein the improvement further comprises said flowmeter including:
   a housing having an air flow passageway wherein said porous media is positioned;
   a first passage in said housing which places said air flow passageway upstream of said porous media in fluid communication with an upstream side of said pressure transducer; and
   a second passage in said housing which places said air flow passageway downstream of said porous media in fluid communication with a downstream side of said pressure transducer.

13. The apparatus of claim 1 wherein the improvement further comprises said pressure differential across said porous media being not more than 3⅓% of said desired air pressure in said tire.

14. The apparatus of claim 1 wherein the improvement further comprises said pressure differential across said porous media being not more man 2.2% of said desired air pressure in said tire.

* * * * *